No. 733,133. PATENTED JULY 7, 1903.
J. W. BRAMWELL.
CEMENT TESTING MACHINE.
APPLICATION FILED JUNE 6, 1902.
NO MODEL.
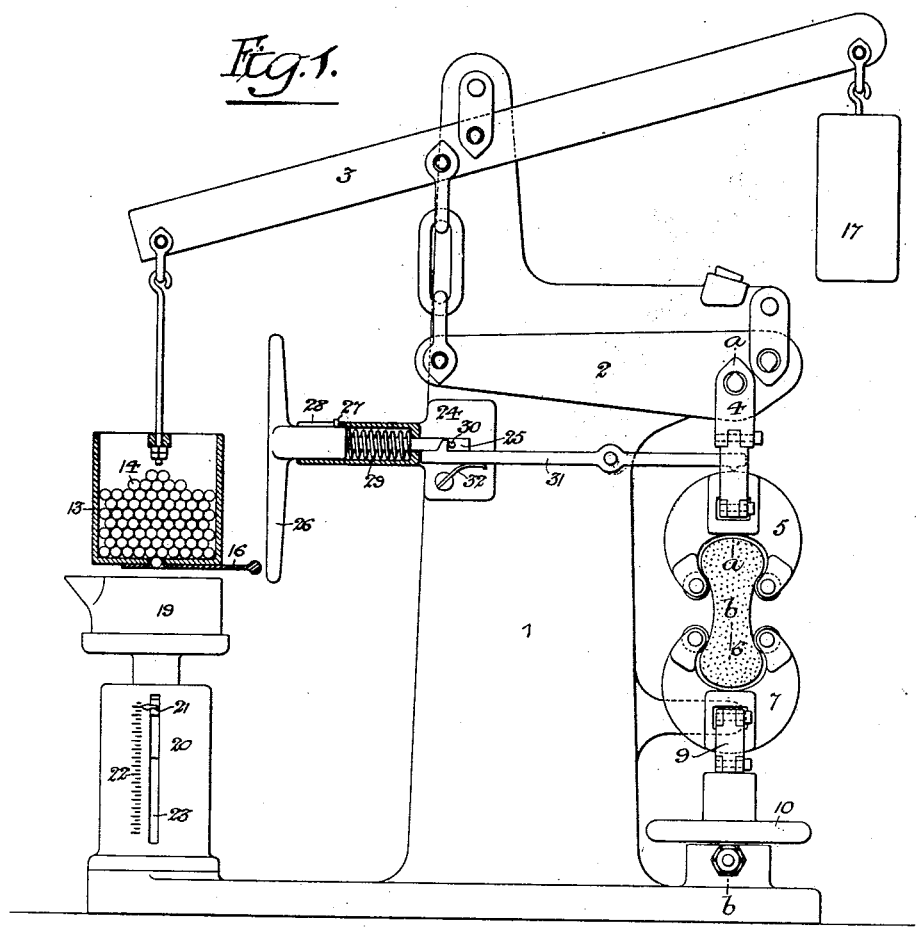
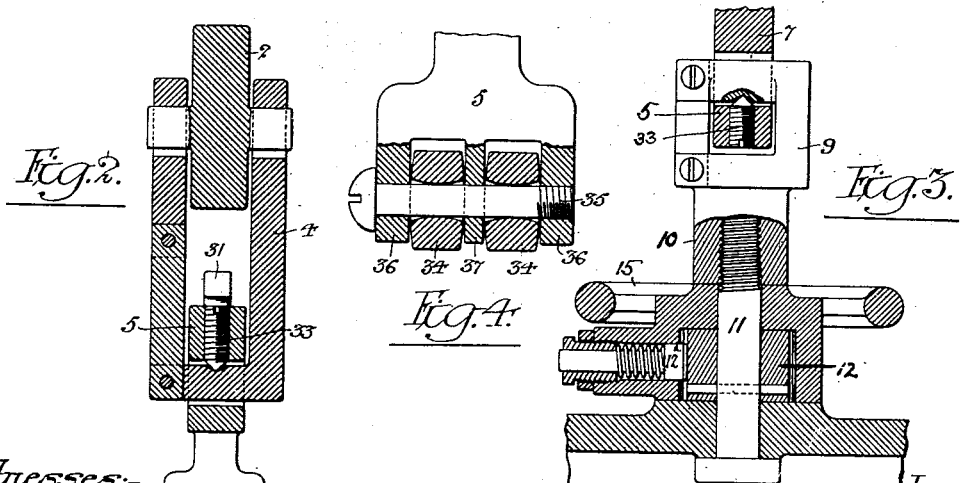
Witnesses:—
H. D. Turner
Herman E. Mehus
Inventor
Joseph W. Bramwell,
by his Attorneys
Howson & Howson No. 733,133.        Patented July 7, 1903.

UNITED STATES PATENT OFFICE.

JOSEPH W. BRAMWELL, OF PHILADELPHIA, PENNSYLVANIA.

CEMENT-TESTING MACHINE.

SPECIFICATION forming part of Letters Patent No. 733,133, dated July 7, 1903.

Application filed June 6, 1902. Serial No. 110,493. (No model.)

*To all whom it may concern:*

Be it known that I, JOSEPH W. BRAMWELL, a subject of the King of Great Britain and Ireland, and a resident of Philadelphia, Pennsylvania, have invented certain Improvements in Cement-Testing Machines, of which the following is a specification.

My invention relates to that class of testing-machines in which the power exerted upon the straining-lever is gradually increased by the dropping of shot from one receptacle to another.

One object of my invention is to so construct a testing-machine of this character as to render it more accurate than such machines as heretofore constructed by relieving the straining-lever from the effect of the impact of the falling shot by shutting off the stream of shot promptly at the instant the specimen breaks and by weighing only such shot as represent the actual load used in breaking the specimen.

Another object is to economize time in making tests by permitting the shot to drop into a pan on a spring-scale or other form of balance which automatically gives by means of a pointer passing over a graduated scale the weight of shot in terms of the equivalent load on the test specimen.

Still further objects are to improve the construction of the clamping-jaws, of the hangers therefor, and of the means for causing them to grip the test-piece.

These objects I attain in the manner hereinafter set forth, reference being had to the accompanying drawings, in which—

Figure 1 is a side view, partly in section, of a testing-machine constructed in accordance with my invention. Fig. 2 is an enlarged transverse section on the line *a a*, Fig. 1. Fig. 3 is an enlarged transverse section on the line *b b*, Fig. 1; and Fig. 4 is an enlarged section of one of the clamping-jaws.

Testing-machines of the character to which my invention relates have heretofore been provided with a straining-lever connected to a scale-beam upon which was hung a pan or receptacle into which was discharged at a uniform rate from a suitable reservoir shot which served to weight the scale-beam, and thereby apply power to the straining-lever until the specimen under test was broken. The accuracy of such a machine is impaired by the fact that the scale-beam received not only the weight of the shot dropped into the receptacle hung thereon, but also the force due to the impact of the falling shot, and owing to the multiplication of leverages this is an appreciable factor in determining the strain exerted upon the test-piece, but a factor of which no account is taken in the subsequent weighing of the shot to determine the strain. In order to overcome this objection, therefore, I use a scale-beam having suspended from one arm of it a receptacle fully loaded with the shot or other weighing units which may be employed and having upon its other arm a counterweight which exactly balances the weight of the receptacle and its load, the scale-beam being therefore in perfect poise at the commencement of the test, but the counterweight being permitted to exert a greater and greater preponderance upon the beam by permitting the shot or other weighing units to escape at a uniform rate from the receptacle, thereby eliminating the element of impact of the falling shot as a factor in determining the strain to which the test-piece is subjected. Furthermore, the escaping shot can be permitted to fall into the pan of a weighing apparatus of any desired character, which will indicate at the termination of the test the load on the specimen equivalent to the weight of shot delivered from the receptacle, the necessity of removing the receptacle from the scale-beam and separately weighing the shot being therefore rendered unnecessary.

In the drawings, 1 represents the fixed frame of the machine, to which is hung the straining-lever 2 and scale-beam 3, the latter being connected to the straining-lever by links and shackles or in any other appropriate manner, so as to exert the desired leverage upon the same. Hung to the straining-lever by means of a yoke 4 is the upper clamp 5 of the machine, which is preferably of the crescent form shown, having a deep back for engagement with the yoke and short horns or jaws for engagement with the upper portion of the test-piece 6, which is of the usual double-wedge form, a clamp of this character being extremely strong and having no tendency to slip upon the test-piece because of the springing of its jaws, the heavy back of the clamp and the limited amount of projection of the jaws from said back rendering the clamp so rigid that such springing of the jaws under any strain to which they are likely to be subjected will be impossible.

The lower clamp 7 is similar in construction to the upper clamp 5 and is hung to a yoke 9, the lower portion of which has a depending nut 10 for the reception of the threaded portion of a stem 11, which has secured to it a collar 12, with notched periphery for engagement with a spring-pin $12^a$, carried by the hub of a hand-wheel 15, which rests upon the base of the machine, the stem 11 being vertically confined to said base by a flange or collar at its lower end. If the yoke has a depending screw-stem, then a nut will be engaged by the hand-wheel 15 through the medium of the spring-pin or like yielding clutch. The lower clamp 7 can thus be drawn downward, so as to cause confinement of the test-piece 6 between it and the upper clamp 5 by turning the hand-wheel 15, the movement of which is transmitted to the screw-stem 11 by means of the spring-bolt $12^a$ and collar 12. If, therefore, the turning of the hand-wheel 15 is continued after the clamps have been tightened upon the test-piece, the spring-pin $12^a$ will yield, so that no further downward strain can be exerted upon the test-piece. By varying the tension of the spring which acts upon the pin $12^a$ the amount of strain to which the test-piece can be subjected in tightening the clamps upon the same can be readily regulated.

Hung upon one arm of the scale-beam 3 is a receptacle 13 for containing the shot or other weighing units 14, this receptacle having in the bottom an opening which is normally closed by a sliding valve 16, mounted on the bottom of the receptacle. Hung upon the other arm of the scale-beam is a weight 17, which exactly counterbalances the weight of the receptacle 13 and its load, so as to keep the beam 3 in poise. Directly beneath the receptacle 13 is the scale-pan 19 of a weighing device 20 of any suitable character, that shown in the drawings being provided with a pointer 21, operating in connection with a graduated scale 22 on the casing 20, in which is a slot 23, through which said pointer projects, the weight of the load upon the specimen being represented by the graduation indicated by the pointer or the latter indicating the actual weight in the scale-pan, which can be multiplied in accordance with the leverage of the machine in order to ascertain the breaking load. Any suitable shut-off valve to stop the flow of shot from the receptacle may be employed and the proper connection made between it and the grip, so that it will act automatically when the specimen breaks. The construction shown in the drawings is as follows: In suitable bearings in a bracket 24 on a fixed frame of the machine is guided a sliding rod 25, having a T-shaped outer head 26, one arm of which projects into position to engage with the sliding valve 16 on the receptacle 13, as shown in Fig. 1, and said head has a transverse pin 27, guided in a suitable slot 28 in the bracket, so as to prevent the rod 25 from turning therein, said rod being acted upon by a coiled spring 29, having a bearing upon the bracket and tending to project the rod, so as to cause the depending arm of its head to act upon the valve 16 of the receptacle 13 in order to close the same. The rod 25 can, however, be held in the retracted position by engagement of a pin 30 on the same with the notched end of a lever 31, which is suitably hung to the main standard of the machine, the other arm of said lever projecting into the yoke 4 and having a bearing upon the back of the upper clamp 5, a spring 32 acting upon the lever and tending to normally retain the same in the position shown in Fig. 1. Supposing that the scale-beam 3 is in equipoise, the valve 16 of the receptacle 13 being closed and the sliding rod 25 being retracted and held in the retracted position by the catch-lever 31, the test-piece inserted between the upper and lower clamps 5 and 7, and the lower clamp adjusted so as to cause a proper grip of the clamp upon said test-piece, the valve 16 is then opened, so as to permit the shot or other weight units to pass one by one from the receptacle 13 into the scale-pan 19, thereby gradually decreasing the weight of said receptacle and causing the counterweight 17 to preponderate to a gradually-increasing extent until the power exerted upon the scale-beam 3 and thence upon the straining-lever 2 causes the parting of the test-piece 6. The upper clamp 5 thereupon immediately rises, thus actuating the catch-lever 31 and causing it to release the sliding rod 25, which is immediately thrust forward under the action of the spring 29, so as to cause the depending arm of its head 26 to strike and close the valve 16, thereby cutting off any further escape of shot from the receptacle 13, the weight of the shot which have passed from said receptacle into the scale-pan 19 being indicated by the pointer 21 and scale 22, so that the reading is given at once without any further attention on the part of the person making the test. The scale-pan is then removed, the shot poured from the same back into the receptacle 13, and the pan restored to position, whereupon the apparatus is ready to be reset for another test.

Each of the clamps 5 and 7 has in its back a transverse opening for the reception of the transverse member of the carrying-yoke, and in order that the clamp may be mounted upon the yoke so as to be capable of a universallyswinging movement thereon to a limited extent the opening in the clamp for the reception of the transverse member of the yoke is of somewhat greater dimensions than said transverse member, which has in one face a conical recess into which projects the conical point of a screw 33, adapted to a threaded opening in the back of the clamp, the flaring of the recess in the back of the transverse member of the yoke being somewhat greater than the flare of the conical point of the screw, whereby a limited amount of swinging movement of the clamp upon the yoke in any direction is permitted. Each of the jaws of each clamp has a pair of antifriction-rollers 34, which constitute the bearing-surfaces of said jaw for contact with the test-piece, these rollers being mounted upon a transverse pin 35, which is supported in the outer cheek-pieces 36 of each jaw and in a central web 37, interposed between the two rollers, whereby a rigid support for the pin is provided and deflection of the same under strain is prevented. The opening formed in each of the rollers for the reception of the pin 35 is flared outwardly from the center toward each end, as shown in Fig. 4, whereby each roller is susceptible of a slight rocking movement on its pin, so that the periphery of the roller will readily adapt itself to any slight departure of the surface of the test-piece from true transverse alinement, and proper contact of the roller with and hold of the same upon the test-piece will thereby be insured. Each of the jaws of the clamp may have but one antifriction-roller instead of two or, on the other hand, may have more than two, if desired.

Having thus described my invention, I claim and desire to secure by Letters Patent—

1. The combination in a testing apparatus having clamps for holding a piece to be tested, of a scale-beam provided at one end with a valved receptacle for containing shot or other weighing units and at the other end with a counterweight for said receptacle, and means supported independently of the scale-beam and placed to be operated by motion of a clamp for moving the valve of the receptacle when the test-piece breaks, substantially as described.

2. The combination in a testing apparatus having means for holding a piece to be tested, of a scale-beam provided at one end with a receptacle for containing shot or other weighing units and at the other end with a counterweight for said receptacle, a valve exterior to the receptacle for closing the outlet of the same, and means supported independently of the scale-beam and placed to be operated by movement of the holding means of the testing-piece for operating the valve of the receptacle when said test-piece breaks, substantially as described.

3. The combination in testing apparatus, of a scale-beam having on one arm a valved receptacle for containing shot or other weighing units, and on the other arm a counterweight for said loaded receptacle, a spring-actuated rod for engaging said valve and moving the same to close it, and a catch-lever for said rod engaging with some element of the machine which receives movement when the test-piece breaks, substantially as specified.

4. The combination in a testing apparatus having clamps for holding a piece to be tested, of a scale-beam having at one end a valved receptacle for containing weighing units and at the other end a counterweight for said receptacle, with means operated by motion of a clamp for moving the valve of the receptacle, said means including a piece for engaging and forcibly moving the valve when the test-piece breaks, and a spring for actuating said piece, substantially as described.

5. The combination in a testing-machine, of a clamp engaging the test-piece, a yoke whereby said clamp is hung to the straining-lever or other element of the machine which carries the same, said yoke having a transverse member passing through an opening in the clamp, and a screw carried by said clamp and having a conical end adapted to a conical recess in the transverse member of the supporting-yoke, substantially as specified.

6. A testing-machine clamp having jaws for engaging the test-piece, said jaws being provided with antifriction-rollers constituting contact-surfaces and held so as to be free to rock upon their pivot-pins to a limited extent in planes parallel to their axis of revolution, substantially as described.

7. The combination in a testing apparatus, of a scale-beam having on one arm a valved receptacle for weighing units and on the other a counterweight for said receptacle, clamps for holding a piece to be tested, mechanism operated by movement of a clamp for operating the valve, said mechanism including a piece independent of the scale-beam placed to engage said valve irrespective of the position of the said beam and the receptacle, substantially as described.

8. The combination of a scale-beam having on one arm a valved receptacle for weighing units and on the other arm a counterweight for said receptacle, the valve of the receptacle being movable in a substantially horizontal plane, a device placed to be operated by motion of a clamp for moving the valve to stop the flow of material from the receptacle, said mechanism including a piece normally out of contact with the valve and extending in a line substantially at right angles to the line of motion thereof so as to be free to operate the valve irrespective of the position of the receptacle, substantially as described.

9. The combination in a testing-machine, of a clamp, a straining-screw therefor, a nut engaging said screw and a screw-operating device including a clutch constructed to yield and thereby maintain within predetermined limits the amount of tension to which said screw may be subjected, substantially as described.

In testimony whereof I have signed my name to this specification in the presence of two subscribing witnesses.

JOSEPH W. BRAMWELL.

Witnesses:
MURRAY C. BOYER,
JOS. H. KLEIN.